3,331,806
DYE RECEPTIVE POLYOLEFIN COMPOSITIONS CONTAINING OXIDES AND/OR HYDROXIDES
Aldo Fior, Milan, and Cornelio Caldo, Terni, Italy, assignors to Montecatini Edison S.p.A., Milan, Italy, a corporation of Italy
No Drawing. Filed July 29, 1965, Ser. No. 475,872
Claims priority, application Italy, Mar. 8, 1961, 4,341/61, Patent 648,416
9 Claims. (Cl. 260—41)

This invention relates to crystalline polymeric compositions suitable for producing textile fibers having improved chemical and physical characteristics and particularly possessing an improved affinity for dyes such as alizarine, National Polypropylene phenolic and dispersed dyestuffs. It is a continuation-in-part of our copending application Ser. No. 177,182, filed on Mar. 5, 1962, now abandoned.

It is known that certain crystalline synthetic linear polymers, having melting temperatures between 150° and 300° C., which are obtained from hydrocarbon monomers, can be used for producing textile fibers.

Many crystalline polymers of vinyl hydrocarbons, for example, isotactic polypropylene, although they are remarkably suitable for the production of fibers because of their mechanical properties and light weight, do however possess a poor affinity for dyestuffs due to their particular chemical structure. That is, since these polymers possess a chemical structure similar to paraffinic hydrocarbons, they generally lack polar or reactive groups which can provide sites of attachment for the dye molecules.

We have now surprisingly found that it is possible to improve the dye affinity of these poly-alpha-olefins by mixing therewith certain inorganic compounds which are able to bind the polymer with the dyestuffs giving water insoluble compounds having remarkable fastness.

It is therefore an object of the present invention to provide polymeric compositions which possess improved dye affinity.

A further object of the present invention is to provide a process for preparing textile fibers from these polymeric compositions.

It is another object of the present invention to prepare textile fibers which possess improved physical and chemical characteristics including improved affinity for dyestuffs.

Other objects and advantages of the present invention will become hereinafter apparent.

The process of the present invention may be applied to poly-alpha-olefins such as those obtained from monomers of the formula R—CH=CH$_2$, wherein R represents an alkyl, cycloalkyl or aromatic group, particularly alpha-olefin monomers such as propylene, butene, pentene, hexene, methylpentene, heptene, vinyl cyclohexane, styrene, etc.

These poly-alpha-olefins may be obtained by using the stereospecific catalyst systems which are able to promote the formation of crystalline polymer fractions, such as the catalytic systems of Natta et al.

Polypropylene obtained by using such a catalytic system containing an organometallic compound of a metal of Groups I, II, or III of the Mendeléeff Periodic Table is especially suitable for use in the present invention.

The inorganic compounds which are mixed with the crystalline alpha-olefin polymers in accordance with the present invention are the salts, acids, oxides, soaps and hydroxides of Al, Cr, Fe, Cu, Sn, Pb, Zn, Ti, V, Tl, Co, Ni, Mg, Sr, Ca, Ba, NH$_4^+$, Na, K, Rb, Cs, and Mn.

The inorganic compounds are desirably employed in the polymer compositions in the ratio of 0.1–15% (by weight), and the polyolefins are therefore used in the ratio of from 99.9–85% by weight.

Any suitable mixing procedure may be employed, but the mix is preferably obtained by stirring the components (polyolefins and inorganic compounds) together at room temperature in a Werner or Henschel type mixer, ball-mill or any similar apparatus.

The mixture thereby obtained is then granulated by melting it in a device provided with a feeding screw. This granulated mixture is then extruded by means of an extrusion spinning apparatus. In this operation, spinnerets having nozzles with a length/diameter ratio higher than 1, are preferably used.

The yarns thus obtained, in accordance with the present invention are of the mono- or pluri-filament type and can be successively used either for preparing continuous yarns, staples, or bulk yarn.

After spinning, the fibers may be subjected to a drawing process, employing drawing ratios between 1:2 and 1:10, preferably between 1:4 to 1:6, at temperatures of 80°–150° C., by using a suitable drawing device which is heated with hot air, steam or similar fluids.

If desired, the fibers may be further treated with acids and alkalis in order to increase their receptivity towards dyestuffs.

The fibers obtained in accordance with the present invention show a remarkable receptivity with respect to dyestuffs, particularly those having the alizarine structure in their molecular or which are dispersed dyestuffs.

The following examples are given to illustrate the scope of the present invention.

The intrinsic viscosity of polypropylene is measured in tetrahydronaphthalene at 135° C. All parts and proportions are given by weight unless otherwise indicated.

*Example 1*

A mix containing 2.7 kg. of polypropylene (obtained using the stereospecific catalysts of Natta et al.) having an intrinsic viscosity [η] of 1.15, an ash content of 0.08%, and a residue after heptane extraction of 94.01%; and 0.3 kg. of zinc hydroxide is prepared at room temperature in a Werner mixer.

The mix is spun by means of a melt-spinning device using the following conditions:

Screw feeder temperature _____ ° C__ 200
Extrusion head temperature _____ ° C__ 170
Spinneret temperature _____ ° C__ 160
Spinneret type _____ mm__ 60/0.8 x 16
Maximum pressure _____ kg./sq. cm__ 25
Winding rate _____ m./min__ 250

The yarns thus obtained are drawn in a steam-heated stretching device using a drawing ratio of 1:5 at 130° C.

The resulting products give intense and fast shades of the dye with the following dyes:

Alizarine Orange A (C.I. 58,015)
Alizarine Red S (C.I. 58,000)
Alizarine Bordeaux B (C.I. 58,500)
Anthrachrome Brown D (C.I. 58,200)
Setacyl Yellow 3G (C.I. Disperse Yellow 20)
Cybacet Scarlet BR (C.I. Disperse Red 18)
Acetoquinone Blue RHO The dyeing is carried out at boiling temperature for 90 minutes (fiber/dying bath ratio=1.40 and dyestuff/dying bath ratio=2.5/100 by weight). When the dyeing was carried out with dispersed dyestuffs, 2% of a surfactant was added, whilst when the dyeing was carried out with an alizarine dyestuff, there were added to the dyeing bath 1% of ammonium acetate and 3% of the condensation product of ethyleneoxide and an alkylphenol.

*Example 2*

A mixture containing 95 g. of polypropylene (obtained using stereo-specific catalysts) having an intrinsic viscosity of 1.4, a residue after heptane extraction of 94%, and an ash content of 0.055; and 5 g. of sodium aluminate is prepared at room temperature in a mixer.

The mixture is spun by means of a melt-spinning device under the following conditions:

| | |
|---|---|
| Spinneret type _____mm__ | 1/0.8 x 16 |
| Extrusion temperature _____° C__ | 210 |
| Maximum pressure _____kg./sq. cm__ | 8.7 |
| Winding rate _____m./min__ | 200 |

The yarns thus obtained are drawn by means of a steam-heated device using a ratio of 1:4 at 130° C., thereupon giving intense and fast dye shades when using the following dyes:

Alizarine Orange A
Alizarine Red S
Alizarine Bordeaux B
Anthrachrome Brown D
Setacyl Yellow 3 G
Cybacet Scarlet BR
Acetoquinone Blue RHO

*Example 3*

At room temperature, a mixture containing 95 g. of polypropylene (obtained using stereospecific catalysts) having an intrinsic viscosity of 1.16, ash content of 0.08%, and a residue after heptane extraction of 95.7%, and 5 g. of calcium metaborate is prepared in a ball mill.

This mixture is spun by means of a melt-spinning device under the following conditions:

| | |
|---|---|
| Spinneret type _____mm __ | 1/0.8 x 16 |
| Extrusion temperature _____° C__ | 215 |
| Maximum pressure _____kg./sq. cm__ | 7.6 |
| Winding rate _____m./min__ | 200 |

The yarns thus obtained are drawn in a steam-heated device using a ratio of 1:4.5 at 130° C. These yarns give intense and fast dye shades with the following dyes:

Alizarine Orange A
Alizarine Red S
Alizarine Bordeaux B
Anthrachrome Brown D
Setacyl Yellow 3G
Cybacet Scarlet BR
Acetoquinone RHO

*Example 4*

Using a mixer of Henschel type and at room temperature, a mix is prepared from 5.4 kg. of polypropylene (obtained using stereospecific catalysts; having an intrinsic viscosity of 1.62, ash content of 0.08%, and a residue after the treheptane extraction of 95.3%) and 0.6 kg. of zinc stearate.

The mixture is spun by means of a melt-spinning device under the following conditions:

| | |
|---|---|
| Screw feeder temperature _____° C__ | 210 |
| Head temperature _____° C__ | 210 |
| Spinneret temperature _____° C__ | 200 |
| Spinneret type _____mm__ | 60/0.8 x 16 |
| Maximum pressure _____kg./sq. cm__ | 25 |
| Winding rate _____m./min__ | 350 |

The yarns thus obtained are drawn in a steam-heated device while employing a drawing ratio of 1:5.3 at 130° C.

The resulting products give intense and fast shades with the following dyestuffs:

Alizarine Orange A
Alizarine Red S
Alizarine Bordeaux B
Anthrachrome Brown D
Setacyl Yellow 3G
Cybacet Scarlet BR
Acetoquinone Blue RHO

EXAMPLE 5

In a mixer of the Henschel type, at room temperature, a mix is prepared from 5.4 kg. of polypropylene (obtained using stereospecific catalysts; having an intrinsic viscosity of 1.62, ash content of 0.08%, and residue after heptane extraction of 95.3%) and 0.6 kg. of aluminum stearate.

The mixture is spun by means of a melt-spinning device under the following conditions:

| | |
|---|---|
| Screw feeder temperature _____° C__ | 210 |
| Head temperature _____° C__ | 200 |
| Spinneret temperature _____° C__ | 200 |
| Spinneret type _____mm__ | 60/0.8 x 16 |
| Maximum pressure _____kg./sq. cm__ | 25 |
| Winding rate _____m./min__ | 350 |

The obtained yarns are drawn by means of a steam-heated device using a drawing ratio of 1:5.3 at 130° C.

The resulting products give intense and fast shades with the following dyestuffs:

Alizarine Orange A
Alizarine Red S
Alizarine Bordeaux B
Anthrachrome Brown D
Setacyl Yellow 3G
Cybacet Scarlet BR
Acetoquinone Blue RHO

EXAMPLE 6

A mixture of 9.810 kg. of polypropylene, 0.170 kg. of nickel stearate, and 20 g. of $TiO_2$ was prepared by mixing in a Henschel type mixer at room temperature.

The characteristics of the polypropylene used are: $[\eta]=1.56$ (as measured in tetrahydronaphthalene at 135° C.) ash content=0.015%, residue after heptane extraction=96.2%.

The mixture thus obtained was granulated in an extruder at 200° C. in an oxygen-free atmosphere. The granulated product was then spun in a melt-spinning device, under the following conditions.

Spinning conditions:

| | |
|---|---|
| Screw feeder temperature _____° C__ | 250 |
| Extrusion head temperature _____° C__ | 250 |
| Spinneret temperature _____° C__ | 250 |
| Spinneret type _____mm__ | 60/0.8 x 16 |
| Maximum pressure _____(kg./cm.$^2$)__ | 77 |
| Winding speed _____(m./min.)__ | 500 |

Drawing conditions:
    Temperature _____ °C __  130
    Medium _____ Steam
    Drawing ratio _____ 1:5

After drawing, the yarn prepared had the following characteristics:

Tenacity _____ (g./den.) __ 5.7
Elongation _____ (percent) __ 25

The dyeability with plastosoluble and with phenolic plastosoluble dyestuffs is found to be excellent.

The fibers showed a high degree of fastness to light and heat, as shown in Table I.

TABLE I

| Dyestuffs | Fastness | | |
|---|---|---|---|
| | Washing at 40° C. | Trichloro-ethylene | To rubbing |
| PHENOLIC PLASTOSOLUBLE DYESTUFFS | | | |
| National Polypropylene brilliant yellow G | 5 | 5 | 5 |
| National Polypropylene brilliant orange E | 5 | 5 | 5 |
| National Polypropylene scarlet RB | 5 | 5 | 5 |
| National Polypropylene violet 2SR | 5 | 5 | 5 |
| National Polypropylene brilliant violet 3E | 5 | 5 | 5 |
| National Polypropylene brilliant blue B | 5 | 5 | 5 |
| National Polypropylene dark blue 2B | 5 | 5 | 5 |
| National Polypropylene green B | 5 | 5 | 5 |
| PLASTOSOLUBLE DYESTUFFS | | | |
| Setacyl yellow 3G (C.I. disperse yellow 20) | 4-5 | 4 | 5 |
| Cibacet scarlet BR (C.I. disperse red 18) | 5 | 4-5 | 5 |
| Setacyl brilliant blue BG (C.I. disperse blue 3) | 5 | 4 | 5 |

Example 7

A mixture of 9.730 kg. of polypropylene and 0.155 kg. of zinc stearate was prepared by mixing at room temperature in a Henschel type mixer along with 50 g. of didodecylthiodiglycolate, 15 g. of 4,4'-thiobis-6-tert-butyl-meta-cresol, 30 g. of calcium stearate and 20 g. of $TiO_2$.

The characteristics of the polypropylene used are $[\eta]=1.56$ (measured in tetrahydronaphthalene at 135° C.), ash content=0.015%, residue after heptane extraction=96.2%.

The mixture obtained was granulated in an extruder at 200° C. in an oxygen-free atmosphere. The granulated product obtained was then spun in a melt-spinning device, under the following conditions.

Spinning conditions:
    Screw feeder temperature _____ °C __ 250
    Extrusion head temperature _____ °C __ 250
    Spinneret temperature _____ °C __ 250
    Spinneret type _____ mm __ 60/0.8 x 16
    Maximum pressure (kg./cm.²) _____ 64
    Winding speed (m./min.) _____ 500
Drawing conditions:
    Temperature _____ °C __ 130
    Medium _____ Steam
    Drawing ratio _____ 1:5

After drawing, the yarn was found to possess the following characteristics:

Tenacity (g./den.) _____ 5.55
Elongation (percent) _____ 23

The dyeability with plastosoluble and with phenolic plastosoluble dyestuffs is found to be excellent.

The fibers showed good fastness to light and heat, as shown in Table II.

TABLE II

| Dyestuffs | Fastness | | |
|---|---|---|---|
| | Washing at 40° C. | Trichloro-ethylene | To rubbing |
| PHENOLIC PLASTOSOLUBLE DYESTUFFS | | | |
| National Polypropylene brilliant yellow G | 5 | 5 | 5 |
| National Polypropylene brilliant orange E | 5 | 5 | 5 |
| National Polypropylene scarlet RB | 5 | 5 | 5 |
| National Polypropylene violet 2SR | 5 | 5 | 5 |
| National Polypropylene brilliant violet 3E | 5 | 5 | 5 |
| National Polypropylene brilliant blue B | 5 | 5 | 5 |
| National Polypropylene dark blue 2B | 5 | 5 | 5 |
| National Polypropylene green B | 5 | 5 | 5 |
| PLASTOSOLUBLE DYESTUFFS | | | |
| Setacyl yellow 3G (C.I. disperse yellow 20) | 4-5 | 4-5 | 5 |
| Cibacet scarlet BR (C.I. disperse red 18) | 5 | 4-5 | 5 |
| Setacyl brilliant blue BG (C.I. disperse blue) | 5 | 4 | 4 |

Example 8

A mixture of 9.940 kg. of polypropylene and 0.040 kg. of anhydrous nickel acetate was prepared by mixing at room temperature in a Henschel type mixer, along with 20 g. of $TiO_2$.

The characteristics of the polypropylene used are: $[\eta]=1.56$ (measured in tetrahydronaphthalene at 135° C.), ash content=0.015%, residue after heptane extraction=96.2%.

The mixture obtained was granulated in an extruder at 200° C. in an oxygen-free atmosphere. The granulated product obtained was then spun in a melt-spinning device, under the following conditions.

Spinning conditions:
    Screw feeder temperature _____ °C __ 250
    Extrusion head temperature _____ °C __ 250
    Spinneret temperature _____ °C __ 250
    Spinneret type _____ mm __ 60/0.8 x 16
    Maximum pressure (kg./cm.²) _____ 72
    Winding speed (m./min.) _____ 500
Drawing conditions:
    Temperature _____ °C __ 130
    Medium _____ Steam
    Drawing ratio _____ 1:5

After drawing, the yarn was found to possess the following characteristics:

Tenacity (g./den.) _____ 5.63
Elongation (percent) _____ 23

The dyeability with plastosoluble and with phenolic plastosoluble dyestuffs is excellent.

The fibers show good fastness to both light and heat, as shown in Table III.

TABLE III

| Dyestuffs | Fastness | | |
|---|---|---|---|
| | Washing at 40° C. | Trichloro-ethylene | To rubbing |
| PHENOLIC PLASTOSOLUBLE DYESTUFFS | | | |
| National Polypropylene brilliant yellow G | 5 | 5 | 5 |
| National Polypropylene brilliant orange E | 5 | 5 | 5 |
| National Polypropylene scarlet RB | 5 | 5 | 5 |
| National Polypropylene violet 2SR | 5 | 5 | 5 |
| National Polypropylene brilliant violet 3E | 5 | 5 | 5 |
| National Polypropylene brilliant blue B | 5 | 5 | 5 |
| National Polypropylene dark blue 2B | 5 | 5 | 5 |
| National Polypropylene green B | 5 | 5 | 5 |
| PLASTOSOLUBLE DYESTUFFS | | | |
| Setacyl yellow 3G (C.I. disperse yellow 20) | 4-5 | 4-5 | 5 |
| Cibacet scarlet BR (C.I. disperse red 18) | 4-5 | 4-5 | 5 |
| Setacyl brilliant blue BG (C.I. disperse blue 3) | 4-5 | 4-5 | 5 |

If desired, other additives such as matting agents, stabilizers, fillers, and the like may be added to the above described polymeric composition prior to the extrusion step.

While the present invention has been described with respect to specific examples, it is to be understood that these examples are for purposes of illustration only and that the invention is not limited thereto, since many variations and modifications can be practiced without departing from its spirit and scope.

Having thus described the present invention, what it is desired to secure and claim by Letters Patent is:

1. A crystalline polymeric composition, for preparation of textile fibers having improved dye receptivity, said composition consisting essentially of at least one crystalline isotactic alpha-olefin polymer and at least 0.1% by weight of said composition of at least one compound selected from the group consisting of the oxides and hydroxides of Cu, Sn, Pb, Zn, V, Mg, Sr, Ca, Ba, $NH_4^+$, Na, K, Rb, Cs, and Mn.
2. The polymeric composition of claim 1 wherein the amount of the selected compound ranges from about 0.1 to 15% by weight of the total composition.
3. The polymeric composition of claim 1 wherein at least one of the crystalline isotactic alpha-olefin polymers is polypropylene.
4. The polymeric composition of claim 1 wherein at least one of the selected compounds is a hydroxide.
5. The polymeric composition of claim 1 wherein at least one of the selected compounds is a metal oxide.
6. The polymeric composition of claim 1 wherein at least one of the selected compounds is an alkali metal compound.
7. The polymeric composition of claim 1 wherein at least one of the selected compounds is an alkaline earth metal compound.
8. The composition of claim 1 in the form of the textile fibers.
9. A process for improving the dye-receptivity of a crystalline isotactic alpha-olefin polymer which comprises mixing therewith at least 0.1% by weight of the total mixture of at least one compound selected from the group consisting of the oxides and hydroxides of Cu, Sn, Pb, Zn, V, Mg, Sr, Ca, Ba, $NH_4^+$, Na, K, Rb, Cs, and Mn.

References Cited

UNITED STATES PATENTS

| 2,367,173 | 1/1945 | Martin | 18—54 |
| 2,725,365 | 11/1955 | Leistner et al. | 260—41 |
| 2,718,513 | 9/1955 | Beardsell | 260—41 |
| 2,947,598 | 8/1960 | Maragliano et al. | 18—54 |
| 2,984,634 | 5/1961 | Caldwell et al. | 260—23 |
| 3,033,814 | 5/1962 | Tholstrup | 260—45.85 |
| 3,069,369 | 12/1962 | Galbraith et al. | 260—23 |
| 3,151,928 | 10/1964 | Cappuccio et al. | 8—55 |
| 3,238,163 | 3/1966 | O'Neill et al. | |
| 3,244,650 | 4/1966 | Hecker et al. | 260—23 |
| 3,265,649 | 8/1966 | Faltings et al. | 260—23 |

FOREIGN PATENTS 849,181   8/1960   Great Britain.

DONALD E. CZAJA, *Primary Examiner.*

LEON J. BERCOVITZ, R. A. WHITE,
*Assistant Examiners.*